May 1, 1934.    M. G. MILLIKEN    1,957,180
METHOD FOR DIGESTING NITROCELLULOSE
Filed Dec. 2, 1930
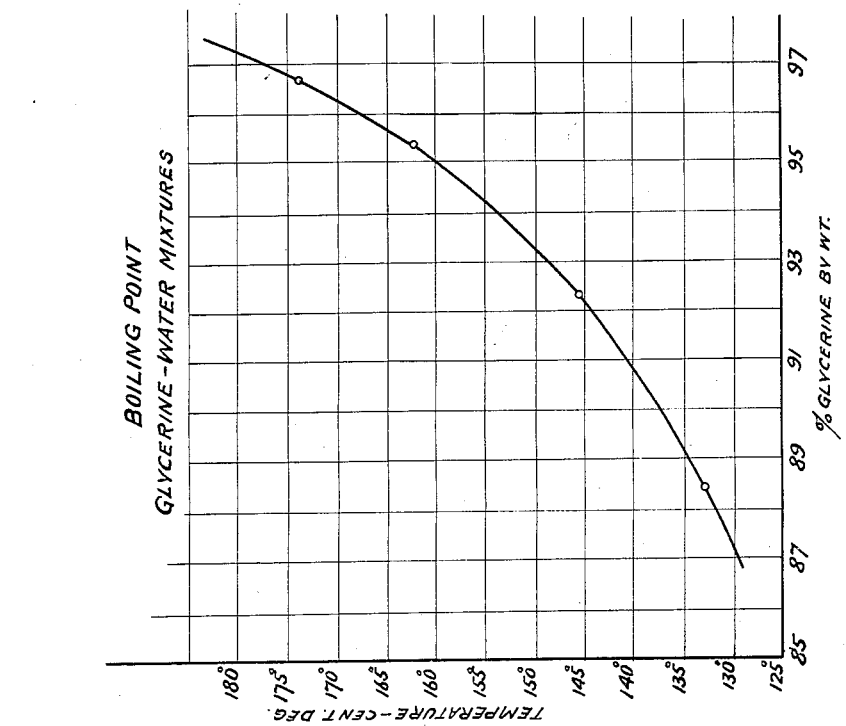
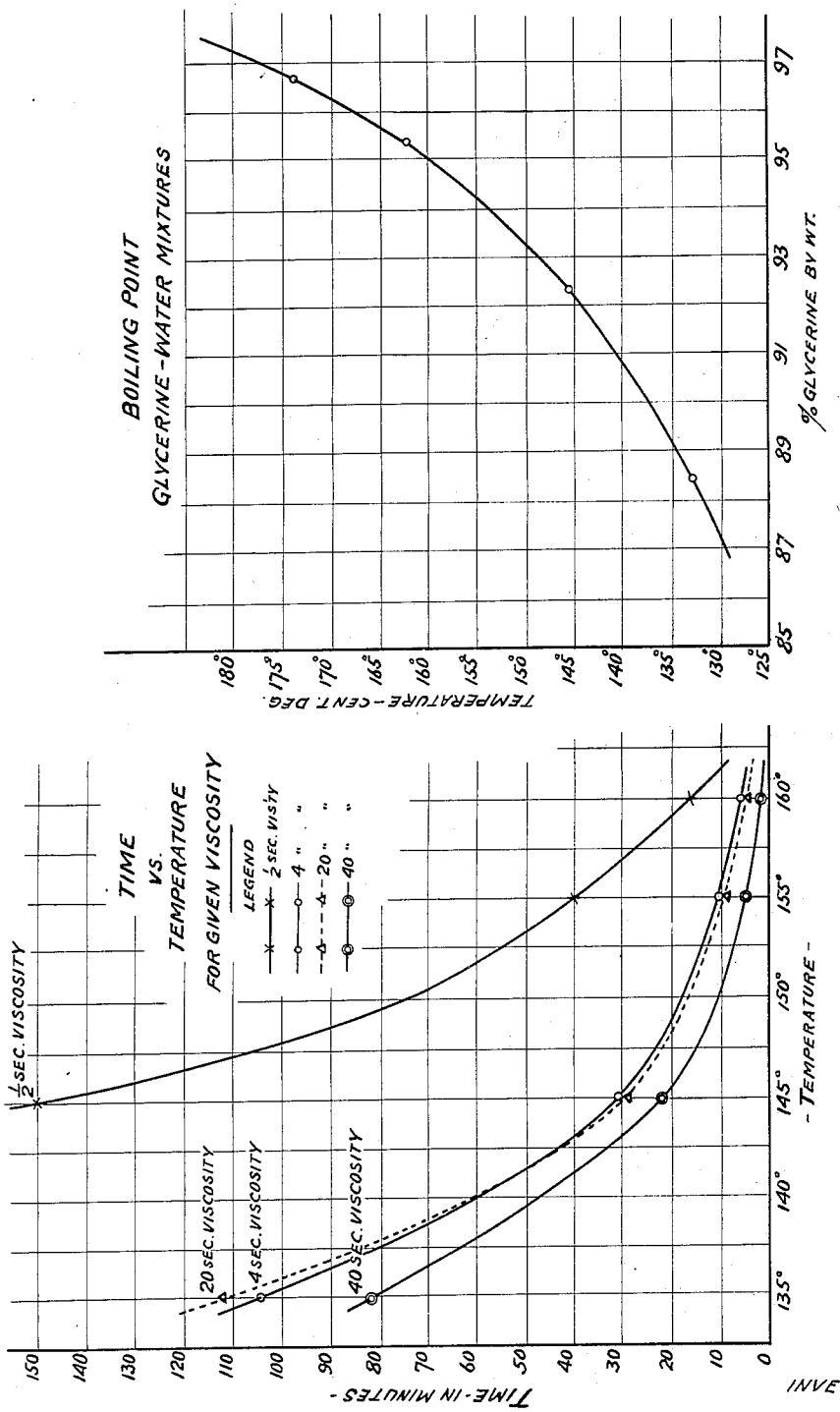
WITNESS:
INVENTOR
Mahlon G. Milliken
BY
Busser + Harding
ATTORNEYS.

Patented May 1, 1934

UNITED STATES PATENT OFFICE 1,957,180

METHOD FOR DIGESTING NITROCELLULOSE

Mahlon G. Milliken, Parlin, N. J., assignor to Hercules Powder Company, Wilmington, Del., a corporation of Delaware Application December 2, 1930, Serial No. 499,463

8 Claims. (Cl. 260—148)

My invention relates to an improved method for digesting nitrocellulose, more particularly to effect reduction of the viscosity thereof. The method in accordance with my invention, while it may be carried out as a batch method, lends itself especially to carrying out as a continuous method.

The method in accordance with my invention comprises essentially subjecting nitrocellulose to be digested to heat treatment in the presence of a liquid or a liquid mixture substantially inert to the nitrocellulose and the boiling point of which is not less than the treating temperature used and which preferably will be above the treating temperature. The precise temperature used for the treatment of the nitrocellulose may vary within wide limits depending upon the time of treatment and the viscosity reduction desired. In the carrying out of the method in accordance with my invention as a continuous method, the liquid or liquid mixture in the presence of which the nitrocellulose is treated, acts as a vehicle or carrier for the nitrocellulose.

In the practical adaptation of the method in accordance with my invention the nitrocellulose may be heat treated, for example, in the presence of glycerine, glycol, a hydrocarbon, as petroleum naphtha, etc., or operable equivalents therefor, or in the presence of a mixture of water and glycerine or glycol, etc. Selection of a suitable liquid or liquid mixture will be readily made by those skilled in the art given the desired temperature of treatment, from which the requisite boiling point of the liquid or liquid mixture will be apparent; and given the fact that the liquid or liquid mixture must be substantially inert to the nitrocellulose and must be capable of separation therefrom, or be of such a character as to be compatible with the use for which the nitrocellulose is intended.

As illustrative of the practical carrying out of the method in accordance with my invention, for example, a quantity of nitrocotton, of a viscosity of say 500-1000 seconds, determined, for example, by the falling ball method on a 16 oz. solution of nitrocellulose in a solvent mixture comprising 20% ethyl acetate, 25% denatured ethyl alcohol and 55% toluol, by weight, at a temperature of 25° C., in any suitable apparatus, is subjected to a temperature of, for example, 160° C. for a period of say about seventeen minutes, for the production of say one-half second cotton, determined as indicated above, in the presence of a glycerine-water mixture containing not less than about 95.5% glycerine. Desirably, twenty parts of the glycerine-water mixture to one part, by weight, of nitrocellulose dry basis are used. Again, the nitrocellulose may be treated at, for example, a temperature of 155° C. for about 40 minutes for the production of say one-half second cotton, in the presence of a glycerine-water mixture containing not less than 94.3% glycerine, or, if desired, the treatment may be effected at a temperature of say 145° C. for a period of about two and one-half hours in the presence of a glycerine-water mixture containing not less than about 92.5% glycerine.

It will be appreciated that in carrying out the method the nitrocellulose, which may be nitrocotton or other form of nitrated cellulose desired to be treated, may be subjected to treatment in the presence of the vehicle in any suitable container, as a tub, or may be passed with the vehicle in continuous flow through, for example, a coil of pipe, necessary heat being applied, for example, by steam introduced into a jacket about the pipe and the length of the coil being such as to allow for the requisite time of treatment of the nitrocellulose in the passage therethrough at a desired rate of flow.

In carrying out the method, the nitrocellulose to be digested may be mixed with the vehicle in a suitable tub in the proportion of 20 parts vehicle to 1 part nitrocellulose, by weight, on the nitrocellulose dry basis and the mixture preheated to say about 100° C. with agitation. The preheated mixture may then be pumped through a suitably steam heated coil where the nitrocellulose is treated at a temperature of say 160° C., the coil being of such length and the rate of flow such that passage through the coil will require the time necessary for the desired reduction in viscosity, say about 17 minutes for the production of one-half second nitrocellulose. The nitrocellulose and vehicle may, if desired, be cooled before discharge from the passage.

When the heat treatment of the nitrocellulose has been completed, whether in a tub, coil, or other form of apparatus, it is treated in any desirable way, for example, it may be fed into wringers, with or without pre-washing with fresh vehicle to remove products of decomposition, which remove excess vehicle. From the wringers the vehicle-wet nitrocellulose may be steeped in a limited amount of water, which may desirably be heated, to remove the vehicle, if its removal is desired, after which the water is drained off, the nitrocellulose if desired may then be washed several times with water and then, if desired, may be dehydrated in the usual manner. The vehicle removed from the nitrocellulose may, of course, be concentrated or recovered for reuse.

In carrying out the method, it will be noted that the vehicle, say a mixture of glycol or glycerine and water, when added to the nitrocellulose preparatory to the heat treatment, must be of higher concentration in glycerine or glycol than required to form a mixture boiling above or not less than the temperature used in the treatment, since the mixture will be diluted to a degree by the water carried by the nitrocellulose as a result of the washing treatments given to it after nitration. Such water usually amounts to about 20%-30% and, it will be understood, must be taken into account in preparing the vehicle for addition to the water-wet nitrocellulose.

The requisite concentration of, for example, a glycerine-water mixture for use as a vehicle, where, for example, the treatment is to be effected at 160° C., may be figured as follows:

Basis 100# nitrocellulose (30% total volatile)
Dry nitrocellulose=.70×100=70#
Glycerine-water necessary for digestion using a ratio of 20:1=20×70=1400#
Desired a glycerine mixture of 95.5% or higher for treatment at 160° C.
Percent glycerine in original mixture=

$$\frac{95.5 \times .1430}{1400}$$

Percent glycerine in original mixture=97.5%

With reference to the relation between time and temperature for given viscosity desired and the relationship between concentration of, for example, glycerine in, for example, a glycerine-water mixture for use as a vehicle and boiling point or temperature of treatment, the accompanying drawing, in which Figure 1 shows time-temperature curves for given viscosity and Figure 2 shows a boiling point curve for glycerine-water mixture, the nitrocellulose treated having an initial viscosity of, for example, 500-1000 seconds, will make obvious the preparation of a suitable vehicle for use in the treatment of nitrocellulose for obtaining desired digestion or reduction in viscosity.

It will be understood that while I contemplate as within the scope of my invention the use of any suitable liquid or liquid mixture which is substantially inert to the nitrocellulose and of a boiling point above or not less than the treating temperature, I prefer to use glycerin or glycol since with the use thereof the nitrocellulose is not only desirably reduced in viscosity but retains its various desirable characteristics to a maximum degree. It will also be understood that desired viscosity reduction may be obtained with the use of various temperatures and times of treatment, it being noted that the lower the temperature the greater the time required. It will further be understood that the nitrocellulose treated for reduction of viscosity may be of any higher or lower viscosity than the 500-1000 second nitrocellulose referred to herein for illustrative purposes.

What I claim and desire to protect by Letters Patent is:

1. The method of reducing the viscosity of nitrocellulose which includes heating nitrocellulose at a temperature in excess of 100° C. to a temperature of about 160° C. in the presence of a mixture of glycerine and water containing more than 95% glycerine.

2. The method of reducing the viscosity of nitrocellulose which includes continuously passing nitrocellulose in admixture with a carrier liquid which is inert to the nitrocellulose and which boils in excess of 160° C. through a heating zone under atmospheric pressure at a temperature of about 160° C.

3. The method of reducing the viscosity of nitrocellulose which includes heat treating nitrocellulose under atmospheric pressure at a temperature of about 160° C. in the presence of glycol.

4. The method of reducing the viscosity of nitrocellulose which includes heat treating nitrocellulose under atmospheric pressure at a temperature of about 160° C. in the presence of a mixture of glycol and water containing more than 95% glycol.

5. The method of reducing the viscosity of nitrocellulose which includes continually passing nitrocellulose in admixture with glycerin through a heating zone under atmospheric pressure at a temperature of about 160° C.

6. The method of reducing the viscosity of nitrocellulose which includes continually passing nitrocellulose in admixture with glycol through a heating zone under atmospheric pressure at a temperature of about 160° C.

7. The method of reducing the viscosity of nitrocellulose which includes heating nitrocellulose in the presence of a mixture of glycerin and water containing more than 95% glycerin.

8. The method of reducing the viscosity of nitrocellulose which includes heating nitrocellulose in the presence of a mixture of glycol and water containing more than 95% glycol.

MAHLON G. MILLIKEN.